United States Patent [19]

Johnson, Jr. et al.

[11] 4,332,083

[45] Jun. 1, 1982

[54] TERMINATING APPARATUS FOR FLAT CABLE

[75] Inventors: Keith Johnson, Jr., Manheim; Robert A. Long, Harrisburg; William R. Over, Harrisburg, all of Pa.

[73] Assignee: AMP Incorporated, Harrisburg, Pa.

[21] Appl. No.: 150,372

[22] Filed: May 15, 1980

[51] Int. Cl.³ ............................................ B23P 19/00

[52] U.S. Cl. ........................................ 29/749; 29/747

[58] Field of Search .............. 29/33 M, 749, 861, 866, 29/747, 748

[56] References Cited

U.S. PATENT DOCUMENTS 3,820,055 6/1974 Huffnagle et al. .
4,020,540 5/1977 Casciotti et al. .
4,110,880 9/1978 Peppler et al. .
4,148,130 4/1979 Stauffer et al. .
4,281,442 8/1981 Senior et al. ...................... 29/33 M

*Primary Examiner*—Francis S. Husar
*Assistant Examiner*—Carl J. Arbes
*Attorney, Agent, or Firm*—F. Brice Faller

[57] ABSTRACT

Terminating apparatus for flat multi-conductor cable comprises a gravity discharge magazine which dispenses connector having a cover partially assembled to a housing preloaded with terminals at a delivery station. A carriage which reciprocates transversely beneath the magazine transports the connector from the delivery station to a terminating station where the cable is inserted between the cover and housing from the opposite direction. A ram presses the housing against the cover to terminate the cable in the terminals while the carriage holds the connector at the terminating station and a clamp holds the cable in a guide channel which aligns the cable for termination.

3 Claims, 9 Drawing Figures

TERMINATING APPARATUS FOR FLAT CABLE

BACKGROUND OF THE INVENTION

1. Field of the Invention

The present invention relates to an apparatus for terminating flat multi-conductor cable to a connector which is fed to the apparatus in partially assembled condition.

2. The Prior Art

The present invention is designed to use connectors of the type generally disclosed in U.S. Pat. No. 3,820,055, and more particularly disclosed in U.S. application Ser. No. 55,565, filed July 9, 1979, the disclosure of which is hereby incorporated by reference. Each connector comprises a housing and a cover which is assembled thereto to terminate the individual conductors of a flat multi-conductor cable to wire-in-slot type electrical terminals mounted in the housing. The terminals include a latching portion at the ends of the tines which form the slots; the latching portion engages the cover to secure it to the housing when the conductors are fully terminated.

In the past connectors of the above described type have been affixed to flat cable in a two step assembly with the housing first being applied to the cable to terminate the conductors and then applying the cover to the housing. An apparatus for terminating a cable in this manner is disclosed in U.S. Pat. No. 4,148,130.

SUMMARY OF THE INVENTION

The instant invention is directed to a terminating apparatus intended primarily for use with a connector of the type described in U.S. application Ser. No. 55,565. This connector is similar to U.S. Pat. No. 3,820,055 but allows for a pre-assembly stage by means of latching arms with lugs thereon extending from the cover which fit into the housing while allowing room between the terminals and the cover for insertion of a cable. Subsequent application of pressure to such a preassembled connector effects termination of the inserted cable.

The instant invention has a magazine in which preassembled connectors are stacked and gravity fed to a delivery station where a single connector is picked up by a carriage which transports it to an insertion station and holds it there while a flat cable is inserted from the opposite direction and terminated by a ram which drops vertically against the housing.

One of the objects of the invention is to provide an apparatus which terminates a flat multi-conductor cable to a pre-assembled connector.

Another object is to provide an apparatus which assures positive feed of a single pre-assembled connector from a magazine.

Another object is to provide a terminating apparatus more simple and economical to manufacture than those used in the past.

Means for accomplishing the foregoing objects and other advantages of the present invention will be apparent to those skilled in the art from the following detailed description and the accompanying drawings.

DETAILED DESCRIPTION OF THE PREFERRED EMBODIMENT

Figure 1:
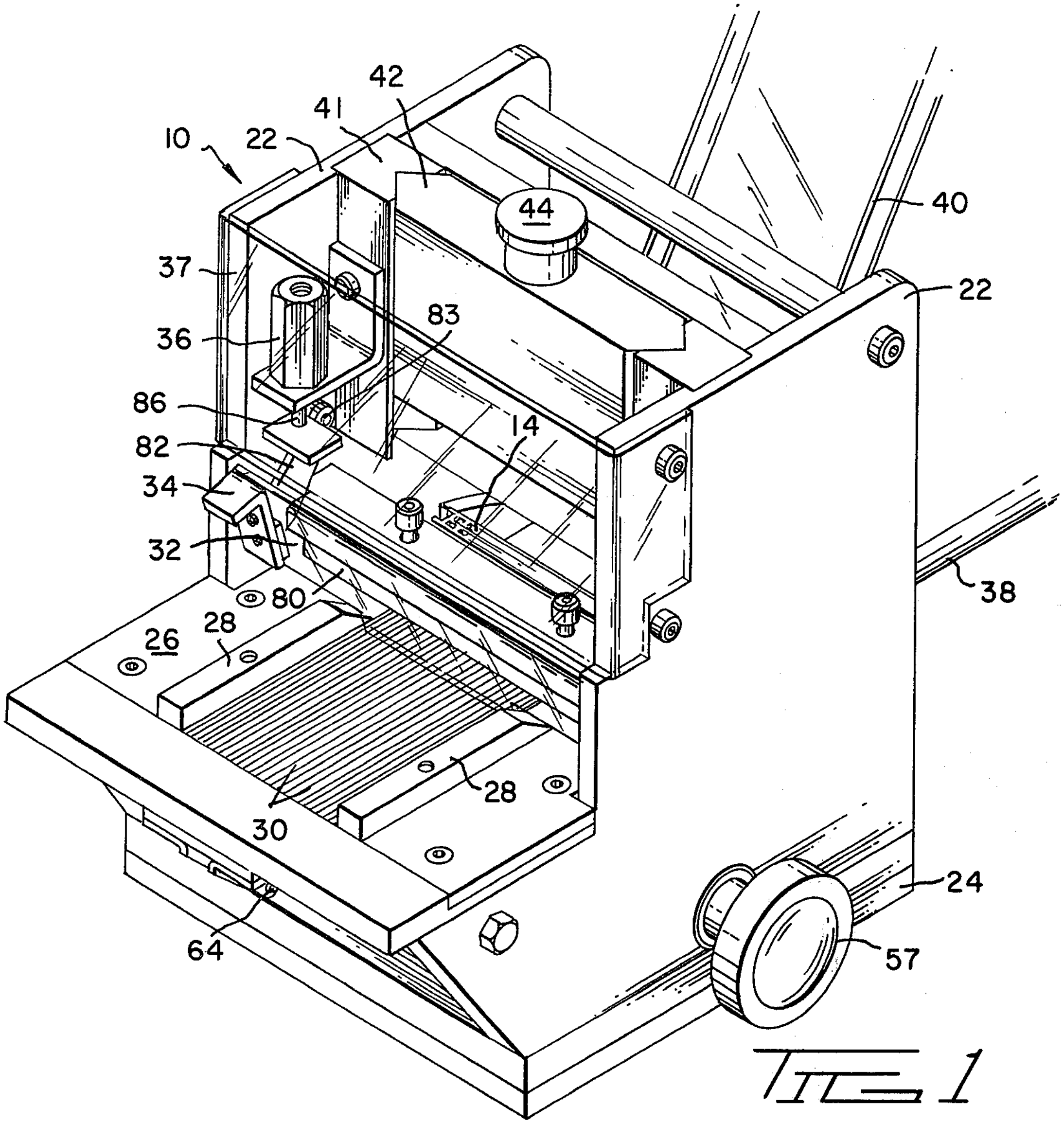
FIG. 1 is a perspective of the terminating apparatus.
Figure 2A:
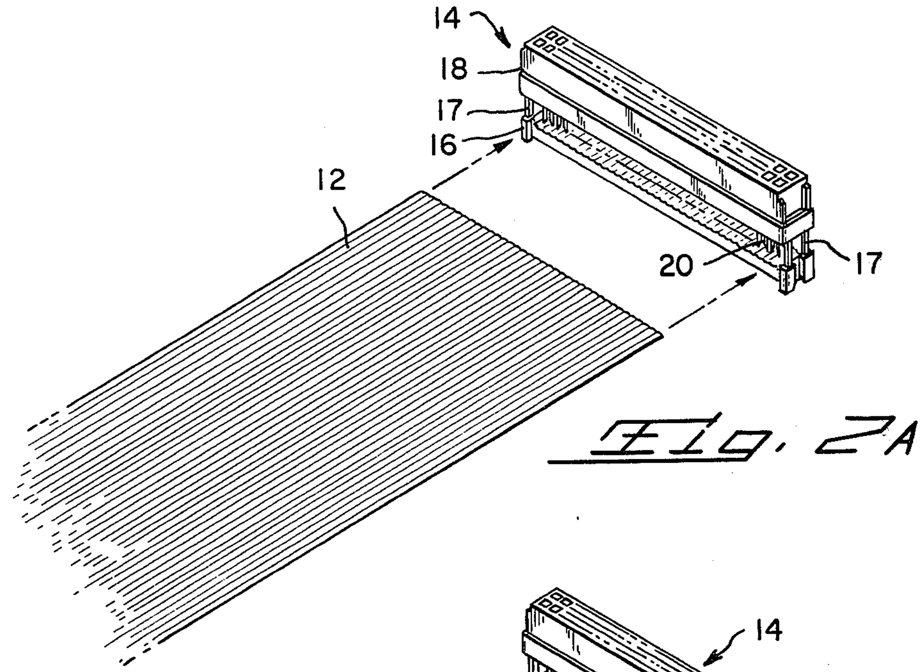
FIG. 2A is a perspective of the cable and partially assembled connector prior to termination.
Figure 2B:
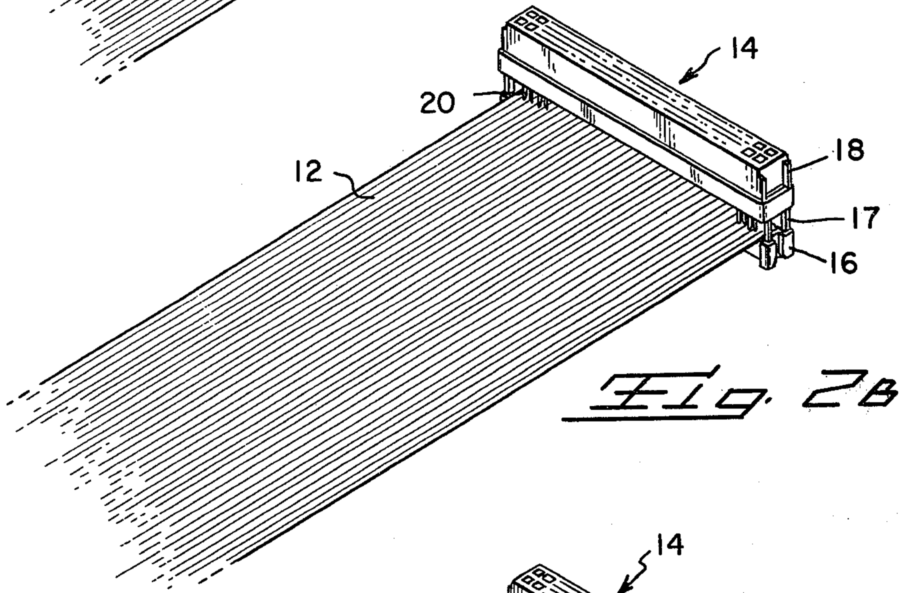
FIG. 2B is a perspective of the cable inserted into the partially assembled connector prior to termination.
Figure 2C:
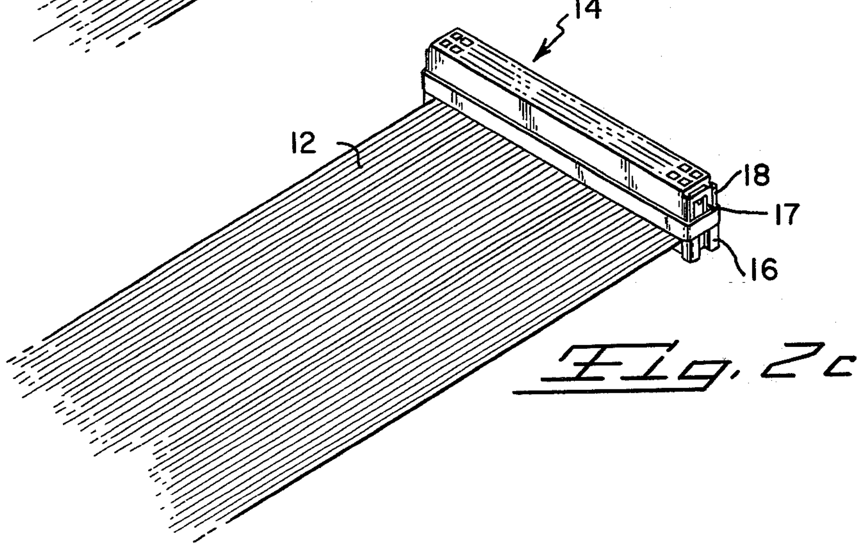
FIG. 2C is a perspective of the cable and assembled connector after termination.

The terminating apparatus 10 of FIG. 1 is used to terminate flat multi-conductor cable as depicted schematically in FIGS. 2A, 2B, and 2C. FIG. 2A shows a flat multi-conductor cable 12 prior to insertion into a partially assembled connector 14. The connector 14 comprises a cover 16 partially assembled to a housing 18 by means of latch arms 17. The housing 18 is preloaded with a plurality of wire-in-slot type terminals 20 which are spaced to displace insulation and make contact with the individual conductors of the cable 12. A space exists between the cover 16 and the terminals 20 for reception of the cable and the pre-assembled connector of the embodiment used here also incorporates a stop feature so the cable cannot be pushed through. The cable 12 is thus inserted into the partially assembled connector 14 as shown in FIG. 2B prior to termination. After insertion of the cable, pressure is brought to bear on the housing 18 while holding the cover 16 stationary to give the termination of FIG. 2C. Locking latches provided on the terminals mate with shoulders on openings in the cover for positive assembly.

Salient features of the invention shown in FIG. 1 include a frame 22 mounted to a base 24 and the insertion table 26 having a pair of blocks 28 affixed thereto on either side of grooves 30. The blocks 28 act as guide means for aligning the cable widthwise therebetween while the grooves 30 receive the individual conductors to place the cable with the precision required to align each conductor with its respective terminal in the connector 14. A clear plastic gate 32 having a finger lever 34 thereon acts on an air valve 36 which activates other operating components as will be discussed. A clear plastic shield 37 mounted to the frame 22 above the gate 32 permits viewing of the operation while precluding incursion of fingers. Most of the operation is pneumatic by air provided through air line 38, and partially assembled connectors are fed to the apparatus 10 by a single magazine 40.

Figure 7:
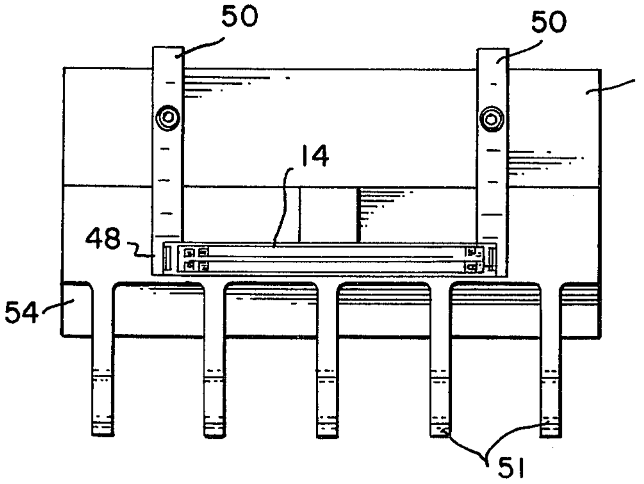
FIG. 7 is a fragmentary plan showing the escapement and lifters.
Figure 3:
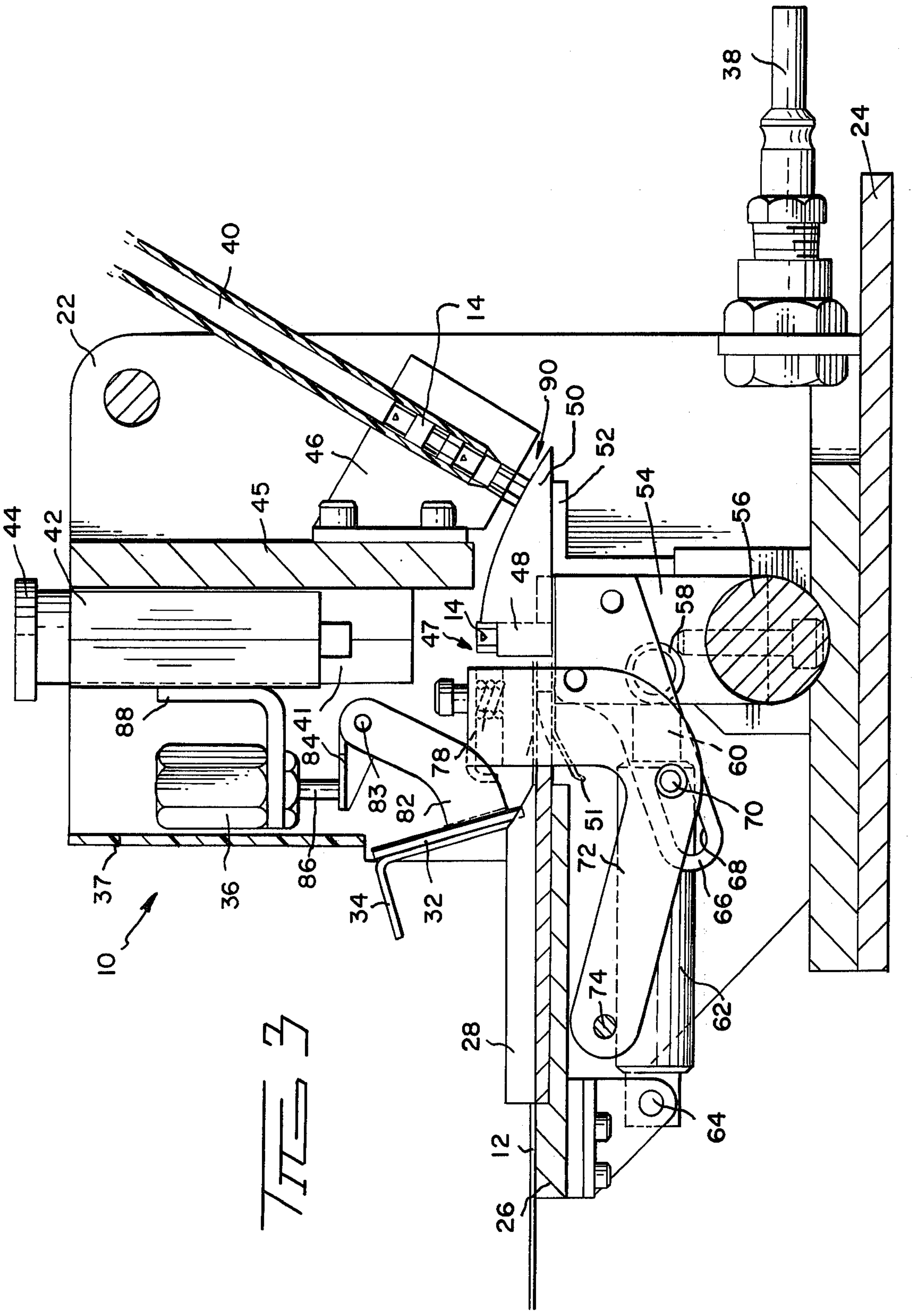
FIG. 3 is a side cross-sectional view of the apparatus just prior to termination.
Figure 4:
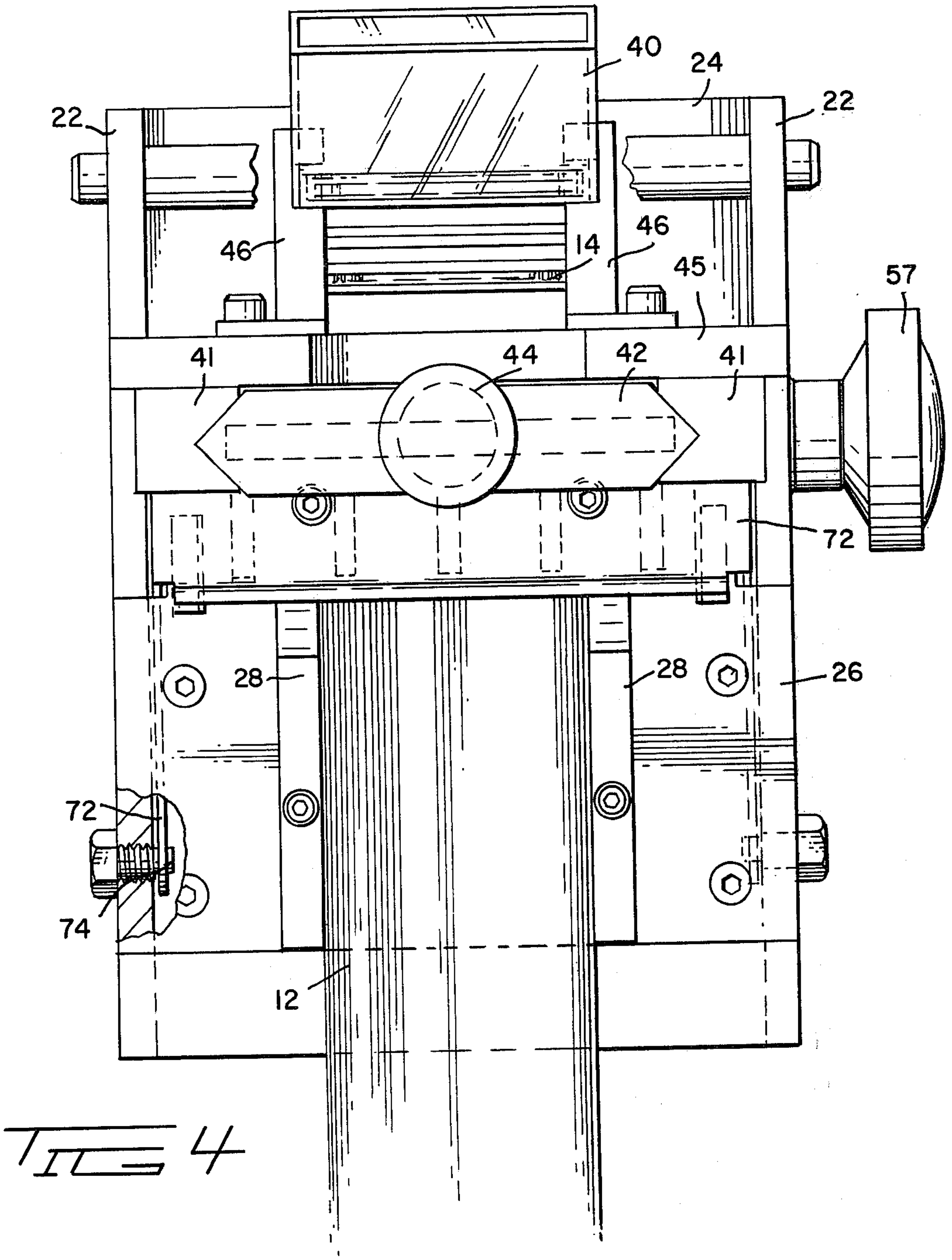
FIG. 4 is a plan view.
Figure 5:
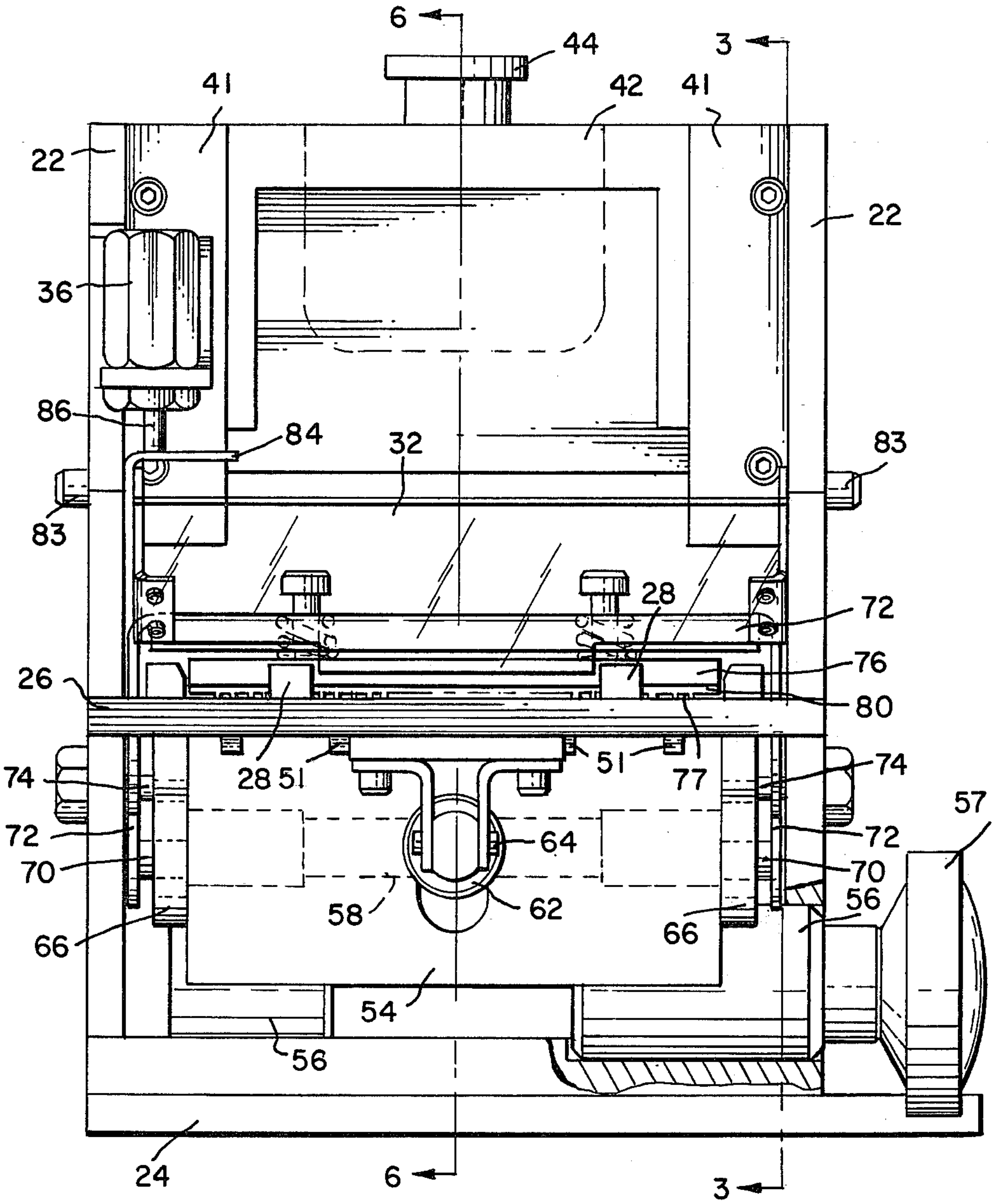
FIG. 5 is a front view of the apparatus.

FIG. 3 is a side view of the apparatus at a stage of operation corresponding to FIG. 2B. A ram 42 slides vertically in gibs 41 mounted to wall 45 and is positioned to press the housing 18 against the cover 16 for termination to a connector 14 located at insertion station 47. These features appear clearly in the plan view of FIG. 4. Collar 44 on top of ram 42 is used to connect the ram to external actuating means such as a pneumatic cylinder with gripping jaws. Also affixed to the wall 45 is a magazine bracket 46 to which magazine 40 is mounted. The partially assembled connector 14 is held stationary at the insertion station 47 by escapement 48 which holds the connector against insertion table 26. The connector 14 is positioned relative to the insertion table 26 such that a cable 12 on the plane of the table will slide neatly between the terminals 20 and the cover 16. The escapement 48 is profiled to accommodate the connector while adjoining escapement blades 50 are profiled to bear against the connector (FIG. 7). The escapement is integral with impounding means in the form of the blades 50 which are attached to anvil 54 by escapement bracket 52. The anvil 54 is mounted to frame 22 of the apparatus 10 at anvil pivots 56 and is arranged for angular motion imparted to it by pneumatic cylinder 62. A pivot handle 57 is provided on the end of the pivot 56 for manual operation if necessary. Connector lifters 51 are attached to the anvil 54 at the escapement 48 and are arranged to ride upward through arched notches 53 in the underside of the insertion table 26 upon angular movement of the anvil 54. The cylinder 62 is mounted to the frame at cylinder pivot 64 and acts on the anvil by means of shaft 60 which moves against cylinder pin 58 journaled on the anvil 54.

Figure 6:
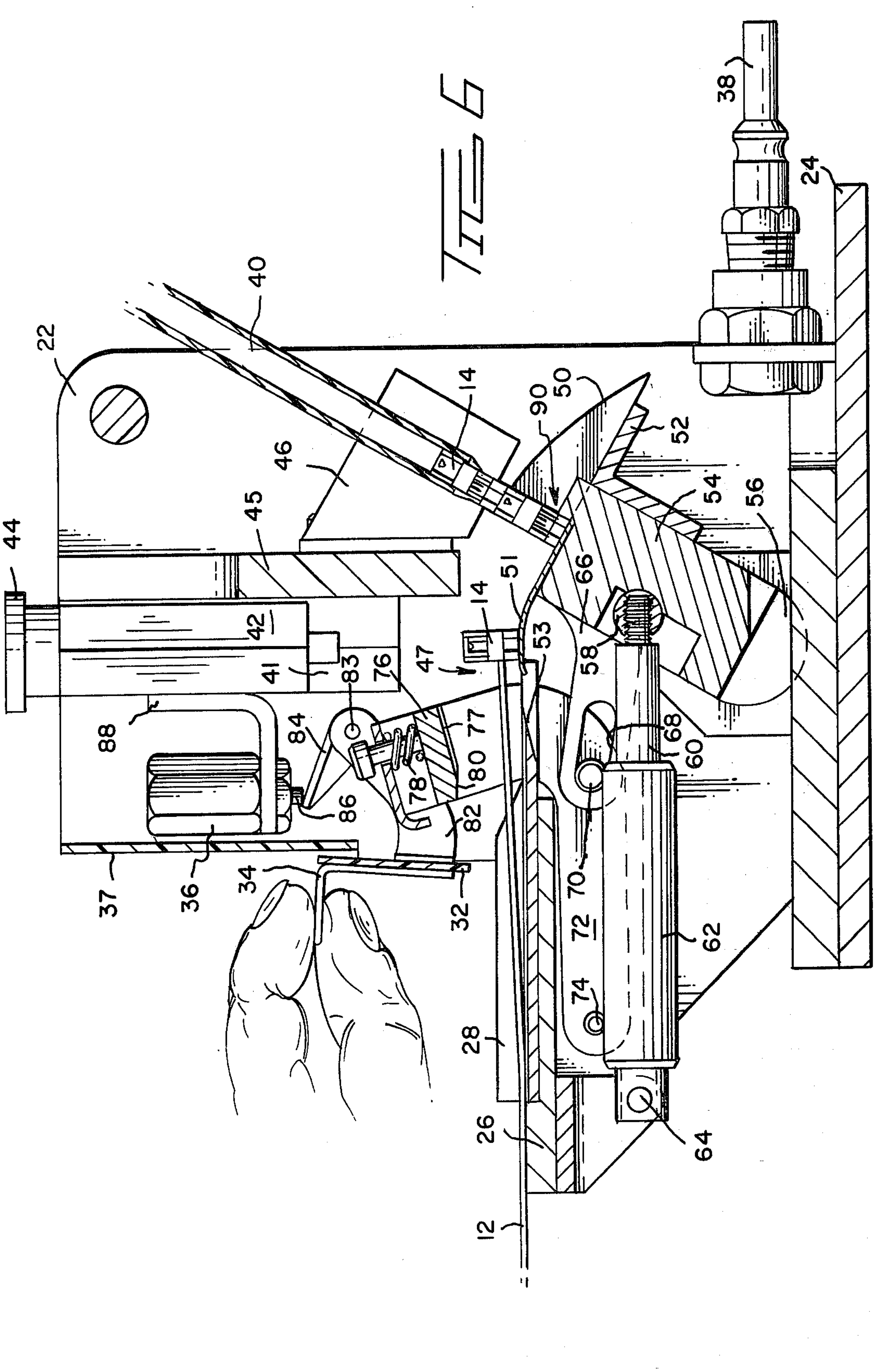
FIG. 6 is a side cross-sectional view after termination with gate and clamp raised, carriage on retrieval, after removal of terminated cable.

Bar cams 66 are mounted to the anvil 54 fixedly on either side thereof, as shown in the side view FIGS. 3 and 6. Angular motion of the anvil thus effects angular motion of the bar cam 66. A clamp frame 72 mounted to the frame 22 of the apparatus at clamp frame pivots 74 on either side of the apparatus is linked to the bar cam by 66 by means of pins 70 fixed to the clamp frame 72 and a slot 68 in the bar cam 66. The clamp 76 is mounted between the sides of the clamp frame 72 and is arranged with spring 78 to press resiliently against the cable 12 for positive positioning. The clamp has grooves 77 paralleling respective grooves 30 in the insertion table 26 for receiving the top face of the cable, and a bevelled lead-in 80 to aid cable insertion.

Referring again to FIG. 3, gate 32 is mounted to gate support 82 which also carries valve lever 84 and is mounted for angular movement about gate pivots 83. The valve lever 84 rides against valve stem 86 which actuates air valve 36 which is mounted to gib 41 by valve bracket 88. The cooperation of these and other elements will now be described.

In order to terminate a flat cable, the gate 32 is left in the down position and a cable is inserted into guide means bounded laterally by blocks 28 and vertically by the insertion table 26 and the clamp 76 until the cable is stopped by the connector at the insertion station (FIG. 3). The clamp 76 is mounted resiliently so the cable fits snugly between the facing grooved surfaces of the clamp and the table. Next the ram 42 is actuated by a foot switch which causes it to press the housing 18 against the cover 16 to terminate the cable to the connector as previously described. The ram automatically retreats.

Referring now to FIG. 6, the operator lifts the finger lever 34 which raises the gate 32 and causes valve lever 84 to bear on valve stem 86 which actuates air valve 36. This causes pneumatic cylinder 62 to push shaft 60 and rocks the anvil 54 backward as shown. Connector lifters 51 ride in notches 53 and lift the connector while the bar cam 66 lifts the clamp 76 by means of the slot 68 and pin 70 so that the terminated cable may be removed. The escapement blades 50 ride under the bottom connector in the magazine 40 until the escapement is at the delivery station 90 directly under the magazine and a partially assembled connector drops by gravity into the escapement.

After removing the terminated cable, the finger lever 34 is released and the valve 36, which is a three way valve, actuates pneumatic cylinder 62, which is a two way cylinder, to effect return of the anvil. The escapement 48 thus transports another partially assembled connector from the delivery station 90 beneath the magazine 40 to the insertion station 47 beneath the ram 42 so that the cable terminating operation may be repeated.

Details of the escapement 48, escapement blades 50, and connector lifters 51 are shown in the fragmentary plan of FIG. 7. It is also important to note in conjunction with this feature that a partially assembled connector received at the delivery station protrudes slightly above the blades as shown in FIG. 6 so that only one connector is received at a time.

While the above description is exemplary, modifications within the scope of the invention will be apparent to those skilled in the art. For example, the anvil 54 needn't be interlocked with the clamp, whereby the anvil and thus the escapement may be cycled by a separate switch. Other alternatives include providing wire stop means in the escapement rather than integral with the connector.

What is claimed is:

1. An apparatus for terminating flat multi-conductor cable to a connector having a cover partially assembled to a housing preloaded with terminals comprises a terminating station where said cable is inserted between said cover and said housing and said cover is fully assembled to said housing by press means operative at said terminating station to fully assemble said cover to said housing, a delivery station where connectors are received from a magazine, transport means for transporting said connector from said delivery station to said terminating station from a direction opposite that of cable insertion, said transport means comprising an escapement which reciprocates transversely of said magazine, said escapement being profiled to receive a single connector from said magazine, said escapement reciprocating between said delivery station and said terminating station, said transport means further having impounding means which prevent a connector from discharging from the magazine except when said escapement is at said delivery station.

2. The apparatus of claim 1 wherein said magazine is a gravity discharge magazine, said escapement reciprocating beneath said magazine.

3. The apparatus of claim 1 wherein said escapement is mounted on the top of an anvil pivotable at the bottom thereof directly beneath said terminating station, said anvil undergoing angular motion to reciprocate said escapement between said delivery station and said terminating station, said press means being operable vertically at said terminating station.

* * * * *